Patented June 15, 1937

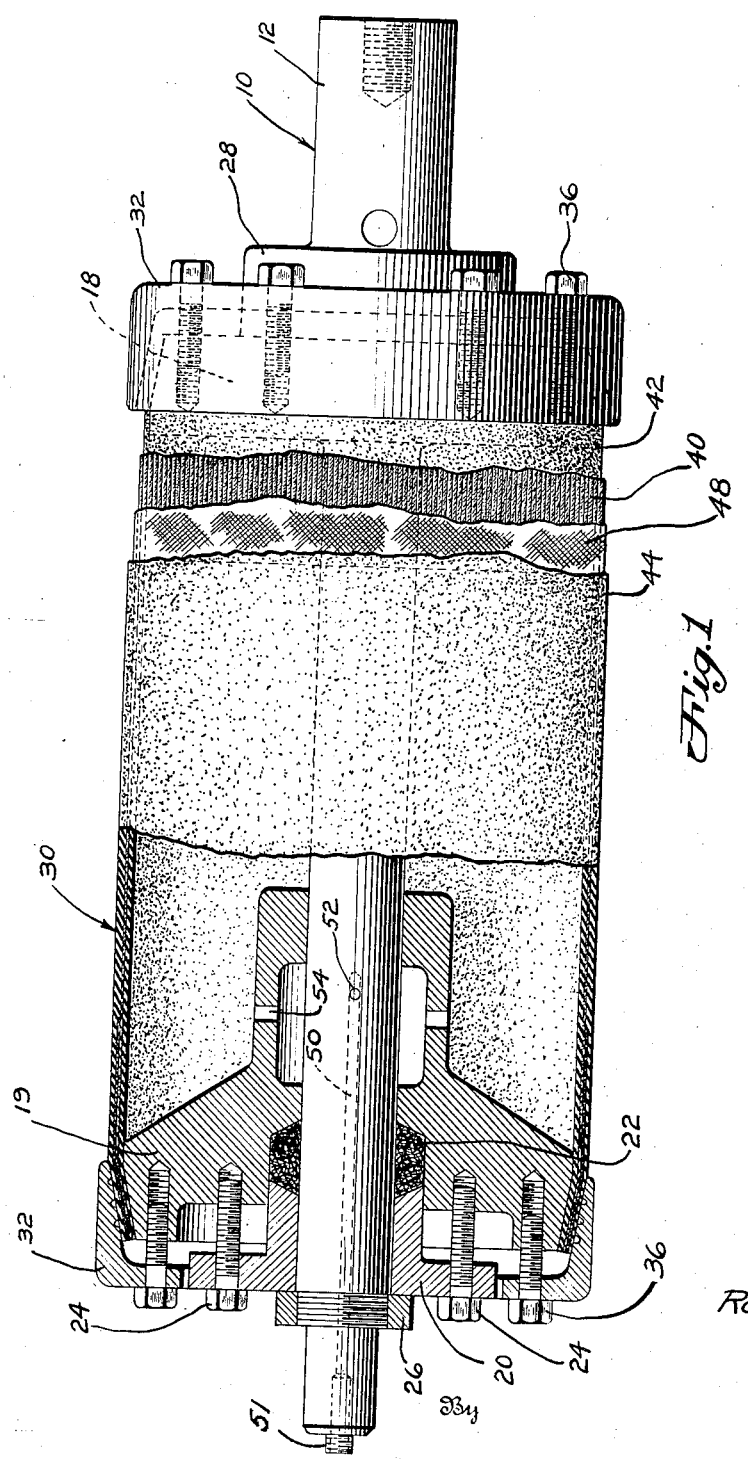

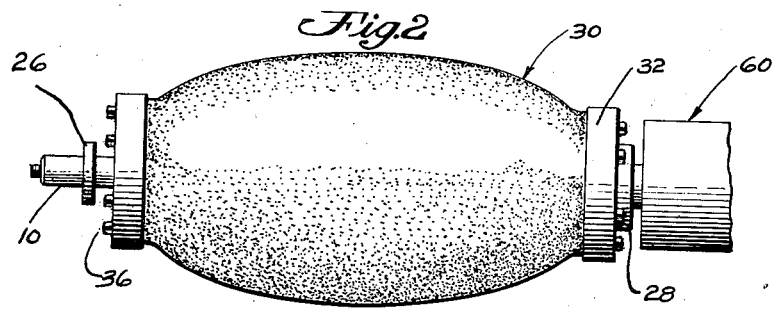
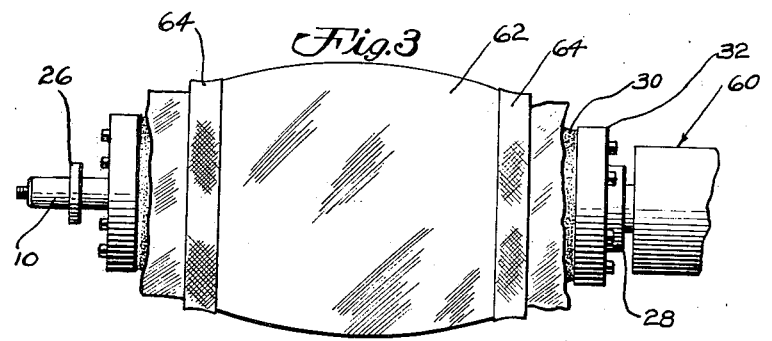
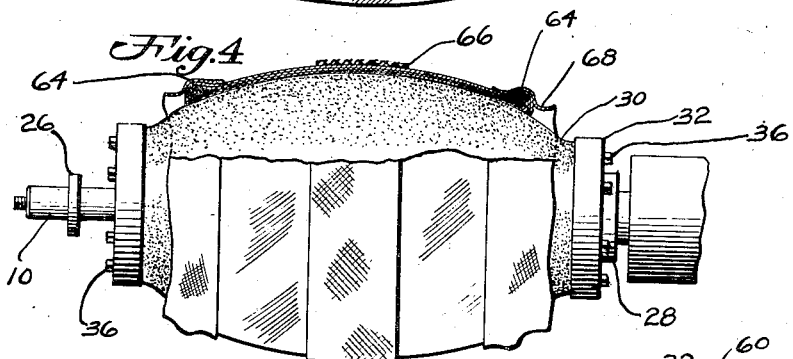
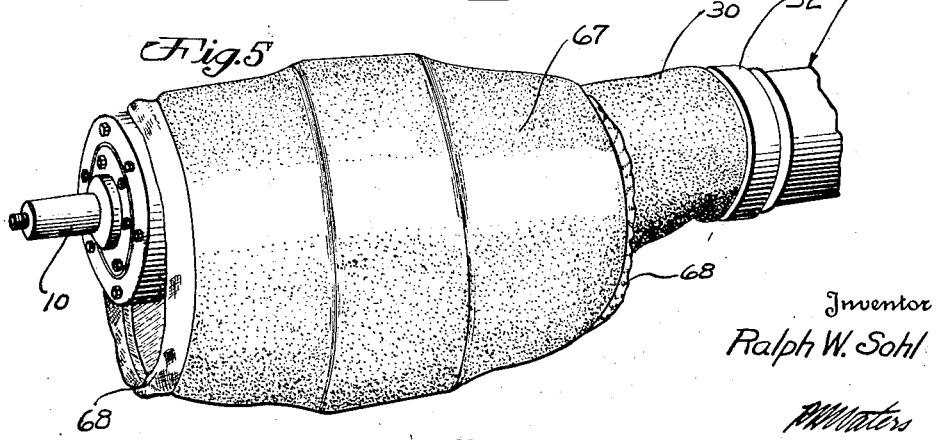

2,084,009

UNITED STATES PATENT OFFICE 2,084,009

APPARATUS FOR MAKING TIRE CASINGS

Ralph W. Sohl, Akron, Ohio, assignor to Wingfoot Corporation, Wilmington, Del., a corporation of Delaware Application September 7, 1934, Serial No. 743,097

8 Claims. (Cl. 154—9)

This invention relates to the manufacture of pneumatic tires and more particularly is concerned with providing improved means and methods for producing supercushion tires having relatively large cross-sectional diameters with small bead diameters.

Prior to the present invention, tires of the superballoon or supercushion type have been manufactured by providing a toroidal-shaped form about which the fabric is stretched or formed to the toroidal tire shape. The form ordinarily has been made in a plurality of parts, as in Patent Number 1,903,458, which will permit the form to be collapsed and removed through the relatively small bead opening of the tire. While satisfactory tires have been produced by apparatus of this type, it will be evident that the core- or form-removing operation and reassembly not only adds considerably to the time of manufacture, but also means that only tires having a certain size bead opening as compared to the overall dimensions can be made. The forms have been found to be clumsy to handle and necessitate such additional time expenditures in the building operation that the cost of the supercushion tire has been relatively high.

It has likewise been found that in building the superballoon type of tire on a toroidal-shaped core the large overall diameter and small bead diameter mean either that the cord count, i. e. cords per inch at the tread portion of the tire, is materially reduced by stretching of the fabric, or else the fabric is piled up in undesirable folds at the bead portion of the tire, which is likewise undesirable.

Some attempt has been made in the past to overcome and avoid the foregoing difficulties, as indicated in Patents No. 1,869,656 and No. 1,952,339, by utilizing a semi-flat or drum-type building form. The type of apparatus employed and the suggested methods of manufacture have not been entirely commercially satisfactory due to the fact that the construction of the building form itself must still be somewhat complicated. It has likewise been found that when the beads of a tire carcass are supported upon a solid form of the type indicated, the removal of the tire from the form, even when collapsed, is rendered difficult.

Other trouble in building supercushion tires by a semi-flat band method arises due to difficulty in maintaining a high cord count at the tread of the tire and in keeping the cord angle of the individual plies the same. The cord angle must necessarily be quite great in the flat band due to the very large shaping and expanding action to which the flat carcass is subjected when forced into toroidal form. Thus if the cord angle of the individual plies varies several degrees it has been found that certain plies in the finished tire will "loaf", while other plies will carry all the tire stresses.

It has been suggested in the past to replace the metal or wood form with some kind of an inflatable core arrangement as, for example, in Patent No. 1,789,143 and Patent No. 1,918,553, however the disclosure of these patents falls short of the improved methods and apparatus taught by the present invention in that the building apparatus is quite different and the method of construction is likewise very dissimilar.

The foregoing and other difficulties of prior-known practices have been largely eliminated or avoided by the provision of an improved apparatus and method for rapidly and effectively producing supercushion tires by a semi-flat band-building operation.

Another object of the invention is the provision of an improved type of inflatable core or drum upon which the tire carcass is adapted to be built.

Another object of the invention is to provide a semi-flat band method of building pneumatic tire casings having small beads but large cross-sectional diameters.

Another object of the invention is to build a pneumatic tire carcass upon an inflatable form on which the entire carcass is carried, with all points of the carcass including the beads well spaced from the support for the inflatable form.

The foregoing and other objects of the invention are achieved by the method hereafter described and the apparatus illustrated in the accompanying drawings wherein;

Fig. 1 is a side elevation of the building drum of the present invention with a portion of the drum being broken away to better illustrate the details of construction;

Fig. 2 is a side elevation of the complete building drum of the present invention;

Fig. 3 is a view similar to Fig. 2 but shows the first two plies and the beads of the tire assembled on the drum;

Fig. 4 is a view similar to Fig. 3 but illustrates the application of the breaker strip to the tire carcass;

Fig. 5 is a perspective view of the building form deflated and with the finished tire carcass ready for removal.

Referring now to the drawings and to the particular apparatus comprising the embodiment of the building form as illustrated in Fig. 1, the numeral 10 indicates generally a shaft having a portion 12 adapted to be supported in a suitable chuck of a rotary drive (not shown). The exact means for mounting the shaft 10 of the building form has not been illustrated in that this mechanism may comprise any standard tire building equipment having suitable means for rotating the building form at various speeds in the desired direction.

Secured to the shaft 10 are a pair of hub members 18 and 19, of which the member 18 is preferably fixed in air-tight relation on the shaft 10 while the member 19 has a sliding air-tight fit on the shaft 10. This sliding fit of the hub 19 on the shaft may be accomplished through the agency of a packing collar 20 which secures packing material 22 in sealing relation between the hub 19 and the shaft 10. Cap screws 24 may be employed to adjustably secure the packing collar 20 to the hub member 19, while a nut 26 threaded upon the shaft 10 as seen in Fig. 1, limits the outward travel of the hub 19 and packing collar 20 on the shaft 10. The hub 18 may be formed integral with the shaft 10 or may be made separately and welded or otherwise fastened thereto and is formed with a reduced portion or collar 28.

Mounted upon the periphery of the hub members 18 and 19 is a resilient cylindrical envelope shown generally at 30. The envelope 30 may be secured at its ends to the hub members 18 and 19, as by providing conical clamp rings 32 which serve to grip the ends of the envelope 30 and clamp the said ends down against the appropriately beveled end or circumference of the hub members 18 and 19. Cap screws 36 may be employed to adjustably clamp the envelope securing rings 32 in the proper position. To effect a more secure seal between the metal supporting members and the flexible envelope, the complementary beveled surfaces of the clamp ring 32 and the hub members 18 and 19 may be made with corrugations such as sealing channels or the like.

The envelope 30 comprises a novel construction in that a layer of reinforcing cords 40 is embedded between inner and outer rubber layers 42 and 44 with the cords 40 extending longitudinally of the axis of the assembly as will be seen in the drawings. This means that the envelope will be free to expand in a radial or circumferential direction by separation of the cords at the layer 40, but will not extend longitudinally and accordingly will provide a much firmer and better base for tire manufacture.

The envelope 30 may likewise be reinforced with ordinary cross-woven breaker or chafer strip fabric which is employed as indicated at 48 in the drawings as a strengthening fabric adjacent the ends of the envelope. It will be noted that the bias cut of the fabric will permit at least partial expansion of the envelope right up to the metal end supports 18 and 19 for the envelope.

The flexible envelope and the entire form is adapted to be inflated or blown up and this is preferably accomplished in the manner seen in Fig. 1. In this figure the extension 16 of the shaft 10 is provided with a longitudinal bore 50 sealed by a valve 51 which is in communication with the interior of the envelope by providing radial ducts 52 and 54. While only one end of the inflatable form has been broken away it will be appreciated that the remaining end of the form is substantially like the first described portion with the exception that flange 28 on shaft 10 takes the place of the nut 26 on the other shaft end and that only one air vent or passage is provided as just described. It will be understood that by making hub 19 slidable on the shaft 10, when the drum is inflated the hub member 19 will move inwardly on the shaft 10 towards the hub 18 due to the expansion of the center of the envelope 30 and because the inextensible longitudinal cords 40 pull the hub 19 inwardly as the envelope expands. When the envelope is deflated the hub 19 ordinarily moves back to position due to the resiliency of the envelope or additional positive springs may be used.

With the construction of the apparatus being understood and the general operation of the improved drum being evident the new method of building tires will now be described, having reference to Figs. 2 to 5. The drum 30 is rotatably mounted upon some suitable rotary support as indicated generally by the numeral 60. The first step in the building operation is to apply the first plies to the building form. It has been found that several alternatives to achieve this result may be followed as, for example, plying the bias-cut cord fabric plies directly to the building form which can be inflated as seen in Fig. 2 or which may be only sufficiently inflated to be retained in the cylindrical form shown in Fig. 1.

However, a preferred method of assembling the first several plies of the tire is to have these plies properly cut to the desired bias, which must be within quite limited angle ranges depending on the size of the tire. The initially cut plies are wrapped around an auxiliary drum to form a sleeve of two-ply fabric with the cords of the two plies ordinarily running in opposite directions. The sleeve is then removed from the auxiliary drum and if necessary soapstoned or otherwise lubricated on its interior, after which it is slipped over the end of the expansible envelope 30 which is in this embodiment of the invention in the cylindrical form seen in Fig. 1.

With the two-ply sleeve on the envelope, the envelope is expanded to partially shape the two-ply sleeve to the curved contour of the expanded envelope. The first plies of the tire have been given the numeral 62 in Fig. 3. In this same figure the beads 64 of the tire have been illustrated in the position at the ends of the initial plies 62. The inner bead 64 having the usual flipper strip associated therewith is preferably passed over the building drum and hung on the rotatable support 60 prior to the placing of the plies 62 on the tire carcass. Thus, after the plies 62 are partially inflated the inboard bead 64 may be moved out into position shown as will be understood by those skilled in the art. The outboard bead 64 can be slipped over the end of the building drum up to the proper spaced position as illustrated so that the beads 64 will be the proper parallel distance apart. The invention likewise contemplates placing the beads over the sleeve at the time the sleeve is slipped on the non-inflated cylinder with the beads first positioned and the form inflated.

The next step in the building operation is to fold the overhanging ends of the plies 62 back around the beads 64 of the tire. This has been illustrated in Fig. 4. The ends may be trimmed off after partially folding around the beads 64 after which the remaining plies of the tire are applied. It has been found advisable in certain tire constructions to further inflate the building form to a somewhat greater degree prior to the application of the final plies. The outer plies are ordinarily put on one at a time with the fabric being laid directly upon the partially built tire carcass carried on the inflated form. The usual bias splice is made at the ends of the plies and the plies are laid with the cords running in opposite directions as will be understood. The ends of the plies are stitched down around the beads and are trimmed off preferably about the heel of the bead. The form can now be still further inflated to shape the plies and this is particularly true where the form was not inflated to a greater degree prior to the application of the final plies.

The usual breaker strip 66, as seen in Fig. 4, is applied to the tire carcass and in addition the tread and side walls 67 and chafer strips 68 may be applied to complete the building of the tire. The form may still be inflated to a greater degree, particularly where no shaping was done after the application of the final plies.

After the whole assembly is stitched down in proper position the envelope 30 will be deflated through the valve 51 so that the finished tire carcass can be removed from the building envelope as seen in Fig. 5. It may be found necessary to fold the outer edges of the chafer strip 68 around the tire bead after the carcass has been removed from the building form. This will, however, depend upon the particular style of tire being manufactured and likewise the resilient cushioning of the beads on the inflatable form often permits the tucking of the chafer strips entirely around the beads.

From the foregoing it will be evident that an improved method has been provided for constructing tires having relatively small bead diameters but large overall diameters with the improved method being in the nature of a modified flat band or crown built process. The tire carcass can be rapidly manufactured to a crown contour without experiencing difficulty in applying the sides of the plies to the beads and yet, likewise, a high cord count will be maintained at the tread portion of the tire, even after the curved tire carcass has been expanded to true toroidal shape prior to vulcanization, in the manner well understood by those skilled in the art.

The improved method and apparatus of the present invention eliminate the use of a multipart collapsible building form with its attendant labor costs, and the method is rapid, efficient and easily mastered so that production costs on the superballoon tire are materially reduced over known methods.

It will be appreciated that the particular embodiment of the invention described and illustrated has been selected in accordance with the patent statutes by way of example only. Thus the invention contemplates inflating the building form to a greater or less degree, building tires of any number of plies and any bead construction. Likewise the details of the building form itself can be altered within the teachings of the invention. It will therefore be understood that the examples illustrated and described do not limit or restrict the invention and that the scope thereof is defined in the appended claims.

What I claim is:

1. Tire-building apparatus which includes a rotatable shaft, hubs carried at spaced points on the shaft, a resilient, normally cylindrical envelope secured at its ends to the hubs, and one of said hubs being secured to the shaft, said envelope comprising an inner and outer layer of rubber reinforced by fabric cords running lengthwise of the envelope directly between the hubs and permitting only radial expansion of the envelope, bias-cut fabric also reinforcing the envelope adjacent the hubs only, and means associated with the shaft for inflating the interior of the envelope.

2. Tire-building apparatus which includes a shaft, hubs carried at spaced points on the shaft, a resilient, normally cylindrical envelope secured at its ends to the hubs, and means associated with the shaft for inflating the interior of the envelope, said cylindrical envelope being characterized by a normal diameter substantially greater than the bead diameter of any tire built thereon and by a length greater than the bead-to-bead width of any such tire.

3. Tire-building apparatus which includes a shaft, hubs carried at spaced points on the shaft, one hub being fixed and the other having sliding air-tight movement on the shaft, a resilient, normally cylindrical envelope secured at its ends to the hubs, said envelope being of air-tight material reinforced by means permitting only radial expansion of the envelope, and means associated with the shaft for inflating the interior of the envelope.

4. Tire-building apparatus which includes a shaft, hubs carried at spaced points on the shaft, a resilient, normally cylindrical envelope secured at its ends to the hubs, said envelope comprising an inner and outer layer of rubber reinforced by fabric cords running lengthwise of the envelope directly between the hubs and permitting only radial expansion of the envelope, and bias-cut fabric also reinforcing the envelope adjacent the hubs only.

5. Tire-building apparatus comprising a shaft, hubs carried at spaced points on the shaft, a resilient, normally cylindrical envelope secured at its ends to the hubs, said envelope constituting means for receiving tire components during tire-building operations, and means for inflating said envelope to extend the same radially beyond its cylindrical contour and to impart thereto a crowned configuration.

6. Tire-building apparatus comprising a shaft, hubs carried at spaced points on the shaft, a radially expansible envelope secured at its ends to the hubs, and means for inflating the envelope, said envelope including a ply of rubberized fabric having only longitudinally extending cords to permit said ply to stretch circumferentially when said envelope is expanding radially.

7. Tire-building apparatus comprising a shaft, hubs carried at spaced points on the shaft, a radially expansible envelope secured at its ends to the hubs, and means for inflating the envelope, said envelope including a ply of bias-cut rubberized fabric adjacent each end to reenforce the same, yet permitting the intermediate portion of the envelope to stretch circumferentially when said envelope is expanded radially.

8. Tire-building apparatus comprising a shaft, hubs carried at spaced points on the shaft, a radially expansible envelope secured at its ends to the hubs and means for inflating the envelope, said envelope including a ply of rubberized fabric having only longitudinally extending cords and end reenforcements of bias-cut rubberized fabric, thus to permit said envelope to stretch circumferentially when said envelope is expanded radially.

RALPH W. SOHL.